United States Patent [19]
Wong et al.

[11] Patent Number: 5,696,953
[45] Date of Patent: Dec. 9, 1997

[54] METHOD AND APPARATUS FOR POWER MANAGEMENT OF AN INTEGRATED CIRCUIT

[75] Inventors: Keng L. Wong, Portland; Kelly J. Fitzpatrick, Beaverton; Jeffrey E. Smith, Aloha, all of Oreg.

[73] Assignee: Intel Corporation, Santa Clara, Calif.

[21] Appl. No.: 597,363

[22] Filed: Feb. 8, 1996

Related U.S. Application Data

[62] Division of Ser. No. 86,044, Jun. 30, 1993, Pat. No. 5,586,307.

[51] Int. Cl.$^6$ .................................. G06F 1/10; G06F 1/32
[52] U.S. Cl. .................................. 395/560; 395/750
[58] Field of Search ........................ 395/560, 750

[56] References Cited

U.S. PATENT DOCUMENTS

| | | | |
|---|---|---|---|
| 5,167,024 | 11/1992 | Smith et al. | 395/750 |
| 5,172,330 | 12/1992 | Watanabe et al. | 364/491 |
| 5,398,262 | 3/1995 | Ahuja | 375/356 |
| 5,428,790 | 6/1995 | Harper et al. | 395/750 |
| 5,446,410 | 8/1995 | Nakakura | 327/565 |
| 5,546,591 | 8/1996 | Wurzburg et al. | 395/750 |
| 5,560,024 | 9/1996 | Harper et al. | 395/750 |
| 5,586,332 | 12/1996 | Jain et al. | 395/750 |
| 5,603,036 | 2/1997 | Wells et al. | 395/750 |

FOREIGN PATENT DOCUMENTS

| | | |
|---|---|---|
| 0359177 | 3/1990 | European Pat. Off. . |
| 2236415 | 9/1989 | United Kingdom . |

*Primary Examiner*—Thomas M. Heckler
*Attorney, Agent, or Firm*—Blakely, Sokoloff, Taylor & Zafman

[57] ABSTRACT

A clock distribution system and clock interrupt system for an integrated circuit device. Ignoring effects associated with the matched stages, the present invention includes a clock distribution and interrupt system for providing clock signals with less than 100 picoseconds of skew to various components of an integrated circuit device. The present invention utilizes several stages of drivers to evenly supply the distributed clock signals and each stage has RC matched input lines. The present invention advantageously locates the matched stages and clock drivers within the power supply ring of the integrated circuit located on the periphery of the microprocessor topology. This is done in order to better predict the topology surrounding these lines to match the capacitance of these lines. Further, this metal level offers a larger width dimension line (since as a top layer it may be thicker) having less resistance per unit area and also generally avoids spatial competition with other IC components and circuitry. The present invention additionally offers the capability of selectively powering down various components within the integrated device with a power management unit and enable network that is included as a component of the clock distribution system.

13 Claims, 11 Drawing Sheets

PRIOR ART

PRIOR ART

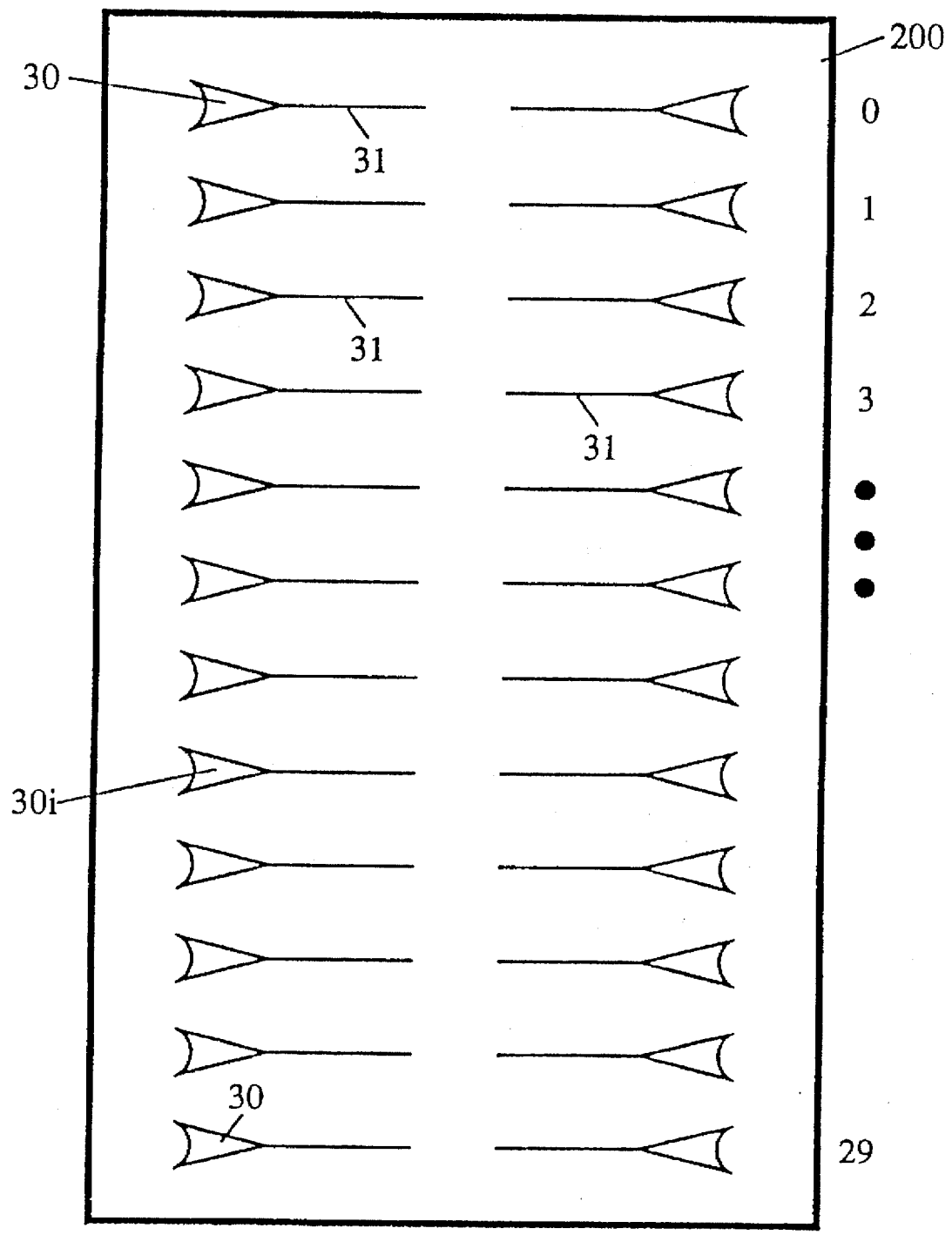

METHOD AND APPARATUS FOR POWER MANAGEMENT OF AN INTEGRATED CIRCUIT

This is a divisional of application Ser. No. 08/086,044, filed Jun. 30, 1993, now U.S. Pat. No. 5,586,307.

BACKGROUND OF THE INVENTION

(1) Field of the Invention

The present invention relates to the field of microprocessor architecture and layout. Specifically, the present invention relates to the technology of clock signal distribution throughout a microprocessor device.

(2) Prior Art

Components of an integrated circuit operate based on the timing and pulsing of clock signals which provide a reference point or activation signal for circuit activity and processing. The clock signal also provides a timing or alignment reference which different circuits adopt when stepping through their respective processing tasks. It is important that the clocking signals be predictable and not delayed such that processing and execution by circuit components are accomplished in synchronization. Microprocessor integrated circuit devices utilize a system clock which provides timing and pulsing to drive the various elements and processing of the microprocessor. It is vital to the operation of a microprocessor that the system clock be supplied uniformly to all components of the microprocessor with minimal clock skew and minimal clock delay. Each system component should receive the same clock signal, in synchronization, with all other components.

Throughout the following discussions, reference is made to clock delay and clock skew. Clock delay refers to the timing delay between a clock signal within an integrated circuit to the system clock. Clock skew, on the other hand, refers to the variations between clock delays associated with various points of an integrated circuit. While it may be physically impossible to totally eliminate clock delay, it is not impossible to match this delay across the entire IC and thus eliminate clock skew to various circuit components. To this extent, two points within an integrated circuit may have equal clock delays, but no clock skew between them. Therefore, it would be advantageous to match clock delays for all circuit components and thus eliminate clock skew within an IC; the present invention offers such a solution.

As microprocessor integrated devices use faster and faster clock speeds, variations in the topology of the microprocessor device may introduce delay or error factors within the metal lines that carry and propagate the clock signal. As the clock signal pulse becomes narrower, these clock signal variations become significant in modern microprocessor design. These factors contribute to propagation errors within the clock signals and will act to delay the clock signals as they are distributed to the various components of the microprocessor. Resistance within the clock line and capacitance on the clock line will create RC skews as the clock signal propagates. Also, other discontinuities within the circuit topology of the microprocessor will add to the propagation error of the clock signal, such as differences in thickness of the components that surround the clock line which introduce variable dielectric values to the signal lines (such as dielectric thickness variations within the insulating layers). These dielectric variations will contribute to the capacitance of the clock signal lines. What is desired is a scheme to provide all components of the microprocessor with a synchronized and identical clock signal even in microprocessor architecture having complex topologies having complex dielectric variations across them.

Several prior art methods have been implemented in order to provide components of a microprocessor integrated device with a clock. FIG. 1A illustrates one such prior art method wherein a signal driver is used to supply a clock signal to all of the components of a microprocessor device. A microprocessor integrated circuit device 10 is illustrated such that its top metal processing layer is facing upward. Within this top metal layer is a connection point from a clock driver 12 which drives the microprocessor clock. The system clock is usually input from outside the chip by an oscillator network or circuit. The clock oscillator is then driven by the clock driver 12. The driver is coupled to a very wide line 14a which is then coupled throughout the microprocessor device in a tree or branch scheme as shown. Different components of the microprocessor will then couple to the branching structure at different points as needed to gain access to the supplied clock signal. As shown, the branchings of the tree 14b and 14c are less in width than the initial line 14a which is coupled directly to the driver 12. The line coupled directly to the driver must be wider in order to carry the entire clock signal throughout the components of the microprocessor device 10.

Because a single clock driver 12 is utilized by the prior art method of FIG. 1A to supply the entire chip, it must be a very high power driver, but this is not the only reason why this prior art technique utilizes a high current driver. It is desired to reduce the resistance of the line 14a by increasing its width to reduce to total RC component of the line. Resistance within the clock driver lines 14a, 14b, and 14c, is a function of the length of the signal line between a point and the driver. Signal skew is a function of the resistance and capacitance (RC) of the line. When the signal lines are relatively small, the proportional increase in line capacitance will not equal the proportional decrease in resistance upon widening the line 14a, therefore, the overall RC product will decrease upon widening 14a. However, by decreasing the resistance, the driver size must increase to supply additional current to the clock line. An increase of power is used to decrease clock skew. This high power driver may create an excessive amount of noise associated with the clock signal. Under this system, the signal lines 14a are widened to lower resistance, which requires relatively higher power clock drivers; all of the above done in an effort to reduce the signal skew.

Because the length of the signal lines are long in the prior art method of FIG. 1A, the skew associated with the clock signal of this method is very great and not predictable from component to component. In larger microprocessors, this skew can approach 1.0 nanosecond in degree. This is an unacceptable level of skew in modem computers that operate at speeds well in excess of 50 megahertz. Also, the variable widths of the signal line (i.e., from very wide at 14a to smaller at 14c) contribute to more variable skew in the signal delivered throughout the microprocessor 10 depending on the length of the signal line. Therefore, this prior art technique requires a high power (and therefore noisy) clock driver and has a corresponding large amount of variable skew associated with the clock signal. What is needed is a clock distribution system that reduces the amount of skew within the clock signal supplied throughout the microprocessor without relying on high power drivers. The present invention offers such capability.

FIG. 1B illustrates another prior art clock supply implementation that utilizes several different current drivers 17a–17d which each receive the same clock signal input.

The outputs of each driver are then coupled to a separate circuit block within the microprocessor. For example, driver 17a is coupled to block 15a, and 17b to block 15b and so on such that each block 15a–15d receives its clock signal by a separate driver of 17a–17d respectively. The widths of each of these lines are controlled such that they are constant. Also the length of each line is controlled such that each line has the same length. Since the components 15a–15d are located at different distances to the clock generators, the lines 18, 19, 20, and 21 are doubled back in some areas to maintain the constant distance. For example line 18 has a few double back running lines so that line 18 will be equal in length to line 19, etc. The line 20 has no doubling back and will determine the length for all the other clock lines. In so doing, the microprocessor device 10 of this design will deliver a clock signal to each component. This system is able to utilize lower power drivers 17a14 17d because the lines are smaller and there are more separate lines to distribute the clock signal.

In theory this prior art design of FIG. 1B is workable but it offers several disadvantages. First, it may not be possible to maintain constant width for each of the lines 18–21 over the entire signal line from the clock drivers to the components. Also, each of the lines will cross over and under different circuit topologies of the microprocessor which will alter the effective capacitance of the overall line. Uncontrollable differences in the manufacture of the signal lines in the processing stages of the microprocessor will effect the thickness of the dielectric of these lines up to 20 percent which will effect the capacitance of these lines and therefore contribute to topological mismatch. Although these variations may exist within all designs, this prior art system does not account for them in the most advantageous manner.

In summary, it may not be possible to match the capacitance values and resistance values of the clock signal lines over the entire topology of the integrated microprocessor device 10. These variations in the resistance and capacitance of the clock signal lines 18–21 will create unwanted signal skew within the clock signals supplied to the components of the microprocessor. Therefore, differences in dielectric values and processing irregularities may render this prior art method unachievable. What is desired is a system that can supply a relatively constant and predictable clock signal to all of the components of a microprocessor regardless of topology and processing variations throughout the microprocessor device. The present invention offers such capability.

A third prior art design is illustrated in FIG. 1C. With this system, many clock drivers 21 are situated in the center strip of the microprocessor 10 and supply clock signals outward horizontally to the right and left sides across the topology of the chip utilizing a horizontal signal line for each driver. The drivers 21 are distributed across the entire dimension of the microprocessor. The maximum length of each horizontal driver line is half the length of the microprocessor chip. Various circuit components 24 and 25 will tap into these clock signals where the drivers supply the illustrated horizontal clock signal lines. Each of the clock drivers are supplied with power via a power line 23 which is coupled to the outer portion of the chip where the power pads 28 are located. Each of the drivers 21 must be coupled to power. The initial clock signal is fed to the drivers 21 via the center strip of the microprocessor device 10. This prior art method is a distributed clock scheme.

The prior art method of FIG. 1C is disadvantageous because the clock drivers 21, and associated logic to initially bring the clocking signal to the drivers, will consume excessive amounts of circuit space within the center strip of the microprocessor. It would be advantageous to utilize this space (real estate) of the microprocessor for purposes other than just a clock supply function. Furthermore, because the drivers 21 are located far away from the power pads 28 of the chip (located on the edges), large power supply lines 23 must be incorporated into this design to supply the drivers 21 with power. The resistance associated with these high power lines create an excessive amount of noise within the overall microprocessor that becomes unacceptable at high processor operating speeds (more resistance yields more noise associated with the power line due to IR noise). Therefore, what is needed is a system for supplying a synchronized clock signal throughout a microprocessor that does not consume valuable circuit space (especially circuit space within the mid sections of the topology which is regarded at a premium) and also that does not generate an excessive amount of noise within the microprocessor. The present invention offers such advantageous functions.

Furthermore, regarding the clock distribution system, it would be advantageous to be able to interrupt the clock signal that supplies the microprocessor device. In certain applications, especially within laptop systems, it is advantageous to conserve power by reducing the clock pulses supplied to the microprocessor. Prior art systems have been developed that control the clock signal that supplies the entire microprocessor but not individual components within the microprocessor. However, it would be advantageous to be able to selectively control the application of the clock signal to various components of the microprocessor independently. It would be advantageous to be able to selectively interrupt the clock signal to some microprocessor components while allowing others to operate normally so as to perform power management functions within the microprocessor device. The present invention allows such capability.

Accordingly, it is an object of the present invention to offer a clock supply system to provide a synchronous clock signal throughout the components of a integrated microprocessor device with minimal signal skew and distortion. It is further an object of the present invention to provide a distributed clock system that does not consume valuable circuit space of the microprocessor that can be used for other advantageous purposes. It is further an object of the present invention to provide the above functions in a system that does not utilize relatively long high power lines and therefore that does not generate an excessive amount of signal noise associated with the clock signal. It is also a function of the present invention to provide the above in a system wherein the clock driver units of the distributed system can be individually disabled so that clocking signals can be temporarily suspended to individual circuit components of the microprocessor device for power management functions. These and other objects of the present invention not specifically mentioned herein will become clear upon review of the discussion of the present invention to follow.

SUMMARY OF THE INVENTION

Embodiments of the present invention include a clock distribution system and clock interrupt system for an integrated circuit device. Ignoring effects associated with the matched stages, the present invention includes a clock distribution and interrupt system for providing clock signals with less than 100 picoseconds of skew to various components of an integrated circuit device. Considering the effects of the matched input stages, the above value may approach 300 picoseconds due to processing imperfections and imperfections associated with the matching input stages. The present invention utilizes several stages of drivers to evenly supply the distributed clock signals and each stage has RC matched input lines. The present invention advantageously locates the matched stages and clock drivers within the power supply ting of the integrated circuit located on the periphery of the microprocessor topology. This is done in order to better predict the topology surrounding these lines to match the capacitance of these lines. Further, this metal level offers a larger width dimension line (since as a top layer it may be thicker) having less resistance per unit area and also generally avoids spatial competition with other IC components and circuitry. The present invention additionally offers the capability of selectively powering down various components within the integrated device with a power management unit and enable network that is included within the clock distribution system.

Specifically, an embodiment of the present invention is described in an integrated circuit having a plurality of circuit components and a clock generator circuit, an apparatus for supplying a plurality of synchronous clock signals to the plurality of circuit components, the plurality of synchronous clock signals referenced from the clock generator circuit, the apparatus including: a plurality of global clock driver means uniformly disposed along a periphery of the integrated circuit, the plurality of global clock driver means for generating a plurality of synchronous clock signals; and a plurality of feeder means, each feeder means coupled to a global clock driver means, the plurality of feeder means for supplying the plurality of synchronous clock signals from the periphery of the integrated circuit to the plurality of circuit components of the integrated circuit. An embodiment of the present invention includes the above and further includes power cell means disposed along edges of the integrated circuit, the power cell means for providing spatial areas within the integrated circuit for coupling the integrated circuit to a power source and wherein the global clock driver means are disposed within the power cell means of the integrated circuit.

An embodiment of the present invention is described in a microprocessor having a plurality of circuit components, an apparatus for power management of the microprocessor, the apparatus including: a plurality of global clock driver means disposed within the microprocessor, the plurality of global clock driver means for generating a plurality of synchronous clock signals; a plurality of feeder means, each feeder means coupled to a global clock driver means, the plurality of feeder means for supplying individual circuit components of the microprocessor with clock signals; disable means disposed within each global clock driver means for interrupting the clock signals supplied to the individual circuit components; and power management means coupled to the disable means and coupled to the microprocessor for controlling the disable means to selectively interrupt or restore the synchronous clock signal to various circuit components of the microprocessor.

BRIEF DESCRIPTION OF THE DRAWINGS

FIG. 2 is an illustration of an integrated circuit device of the present invention utilizing a clock distribution network of two rows of global drivers and associated feeder lines located on opposing edges of the integrated circuit device that feed inward.

DETAILED DESCRIPTION OF THE INVENTION

The present invention includes an apparatus and method for distributing a clock signal throughout the components of a microprocessor device such that there is a predictable and minimal amount of signal skew (less than 100 picoseconds) at any given supply point of the clock signal. Using the distribution system of the present invention, the clock signal will reach each component of the microprocessor at relatively the same time irrespective of the particular tap point selected by the component. Along the outer edges (periphery) of the microprocessor topology, the clock drivers are located which feed clock signals inward to the center or interior portions of the microprocessor. The clock signal drivers are situated in the surrounding space of a power pad of the microprocessor. These surrounding spaces of the power pad are typically otherwise unused by the microprocessor and therefore the signal drivers of the present invention do not waste otherwise usable circuit space. Also, because the signal drivers are located on the edge of the integrated circuit microprocessor device, they are near the power supply pins. Therefore, the resistance within the lines that power the clock drivers is very low because the power supply lines are short.

In addition, the present invention includes, for each clock driver, an enable function so that each clock driver can be disabled to temporarily interrupt the clock signal supply to various components of the microprocessor. This can be done to selectively power down certain components of the microprocessor during power management functions. This function is especially useful in microprocessors used in laptop computer systems or battery powered systems.

In the following detailed description of the present invention numerous specific details are set forth in order to provide a thorough understanding of the present invention. However, it will be obvious to one skilled in the art that the present invention may be practiced without these specific details. In other instances well known methods, components, systems and electronics have not been described in detail as not to unnecessarily obscure the present invention. Furthermore, it is noted that components of the following figures of the present invention are not necessarily drawn to scale spatially and the components of the present invention are illustrated within these figures for purposes of illustration and clarity rather than purely for purposes of scale.

Figure 8:
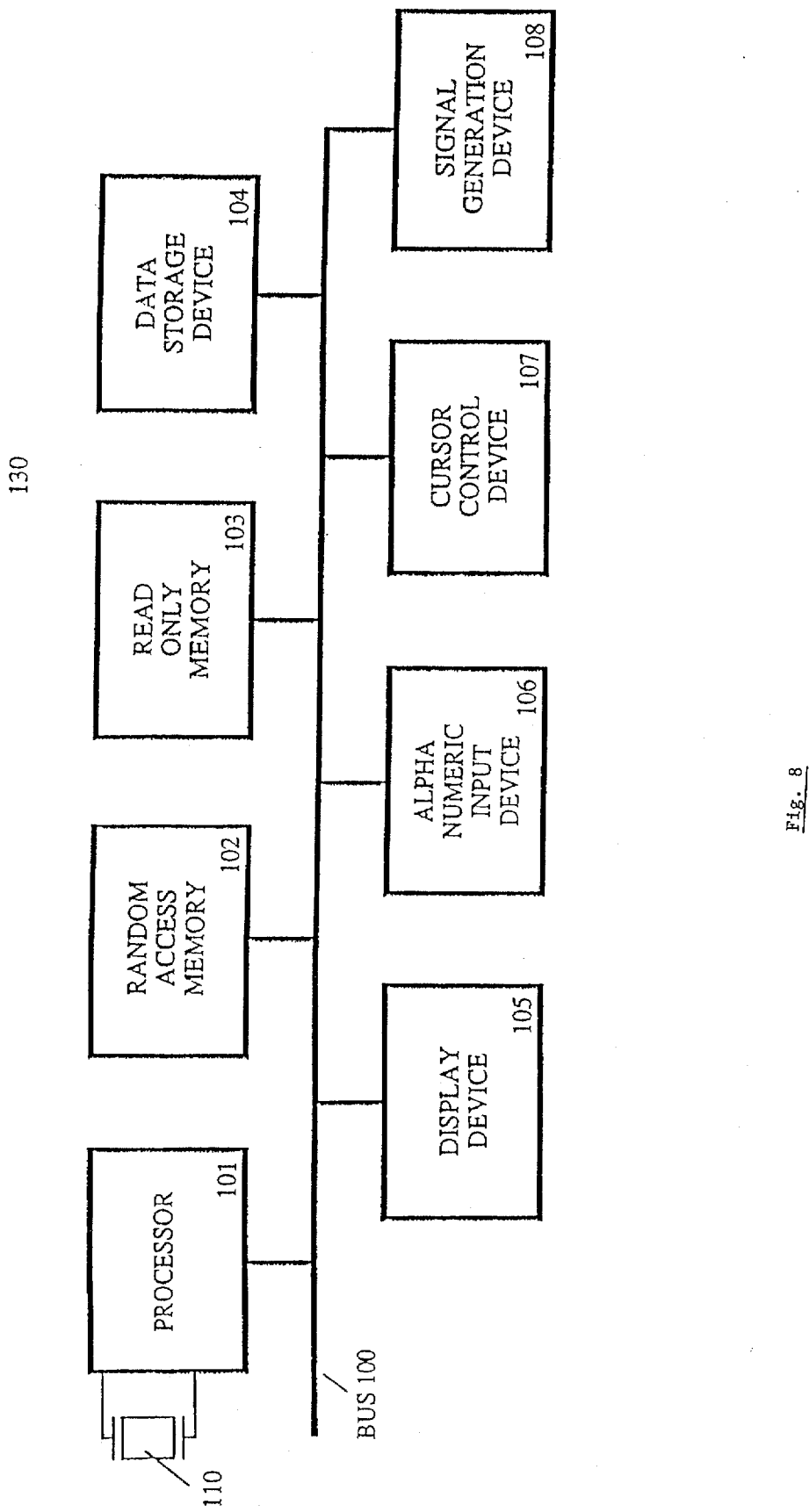
FIG. 8 illustrates a general purpose computer system employing the integrated circuit of the present invention.

In general, computer systems 130 used by the preferred embodiment of the present invention as illustrated in block diagram format in FIG. 8, comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101. Coupled with the microprocessor of the present invention is a crystal oscillator 110 that is used along with other well known clock generation circuitry in order to generate a system clock which is supplied to the microprocessor. A common clock driver 301 (not shown in FIG. 8) is coupled to receive and amplify the clock signal generated by the oscillator circuit 110. It is appreciated that embodiments of the present invention may utilize a phase locked loop (PLL) circuit which is coupled between the circuit 110 and driver 301; such a PLL is utilized in the clock supply functions of the present invention to reduce actual clock signal delay.

The display device 105 of FIG. 8 utilized with the computer system of the present invention may be a liquid crystal device, cathode ray tube, or other display device suitable for creating graphic images and alphanumeric characters recognizable to the user. The cursor control device 107 allows the computer user to dynamically signal the two dimensional movement of a visible cursor symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor control device 107 also may be directed and/or activated via input from the keyboard using special keys and key sequence commands.

The following detailed description describes the present invention clock distribution and interrupt system within a microprocessor integrated circuit. However, it is appreciated that the advantages, design and components of the present invention can be implemented in any integrated circuit using a clock signal and that a microprocessor was described as an illustration of the functionality of the present invention. It is understood, therefore, that the present invention is not limited to the technology and environment of a microprocessor device but applies to all clock driven integrated circuit devices.

Clock Distribution Network of the Present Invention:

Refer to FIG. 2 which illustrates the preferred embodiment of the present invention. The top most processing layer of a microprocessor integrated circuit 200 is shown. According to the present invention, global clock drivers 30 are located along the right and left edges of the microprocessor device 200. Each of the global clock drivers 30 is supplied with a clock signal over matched input lines (not shown). Each clock driver 30 feeds a clock signal into the middle sections of the microprocessor device 200 by feeder lines 31. The feeder lines 31 each are coupled to a separate global driver 30 which supplies the system clock signal to the feeder line 31. By placing the global drivers along both the left and right periphery of the microprocessor and then driving feeder lines inward, the present invention is able to provide the system clock at many locations throughout the topology of the microprocessor device 200. The clock signal can be tapped at any feeder line to supply a clock signal to any component or sub-circuit of the microprocessor device.

The feeder lines 31 are composed of $M_4$ metal which is the fourth level metal applied during a typical semiconductor processing procedure. The metal $M_4$ (upper level metal) is mostly composed of aluminum (over 90 percent) and is one of the least resistive metals used in semiconductor processing. The present invention utilizes the $M_4$ metal because this process level allows the feeder lines to be very thick in dimension in order to reduce the resistance of the feeder lines. The $M_4$ level was also selected because this level is associated with the processing of the power lines of the present invention which are located relatively separate spatially from the remainder of the circuit topology of the microprocessor. Because these lines are separated from the circuit topology, they do not interfere with the topology and do not take otherwise usable space from the circuit topology. Additionally, by locating the major clock supply lines (i.e., 340, 341, 342, etc. which will be described later) and other clock signal lines in the $M_4$ level, the present invention is able to easier RC match these lines because the power line level sees a very predictable lower level topology that has a relatively constant dielectric associated with it whereas the remainder of the microprocessor topology is variable and unpredictable to RC match.

The transistors utilized by the preferred embodiment of the present invention for the clock drivers are CMOS technology. This is selected because the CMOS drivers have less sensitivity to the power supply variations as compared to BiCMOS and NMOS technologies and therefore CMOS drivers tend to create more uniform duty cycles within the resultant clock signal. The present invention utilizes a 50 percent duty cycle clock signal. The CMOS drivers have more equivalent signal rise and fall times to create a more uniform and balanced clock signal.

The theory of operation of the present invention is described. Matched signal lines, that is, signal lines having matched resistance and capacitance for each line, help to reduce the variation in signal delay across the components of the microprocessor device. Signal skew as a result of mismatch, or RC skew (variations of clock delay), can be reduced (within the feeder lines) by reducing the effective resistance and capacitance within a clock supply line. However, creating totally matched signals lines may not be achievable throughout the microprocessor device because of integrated circuit processing variations, the variations within the topology of the microprocessor that surrounds a signal line and other variables that may not be controllable by a circuit designer. Instead of attempting to provide matched signal lines at all points or taps within the clock signal supply lines, the present invention attempts to provide many global clock drivers which provide many feeder lines throughout the microprocessor device 200. In so doing, the present invention provides many locations onto which a clock signal may be reached or "tapped". Therefore, for any given point within the microprocessor device there will be a relatively short distance between that point and the nearest clock supply line. By reducing the distance between the circuit blocks and the clock supply lines 31, the present invention reduces the errors and skew associated with the clock signal supply network. According to the present invention, there should be only a 100 picosecond skew maximum associated with the clock signal at any point along a feeder line.

A major task accomplished by the present invention is to provide each feeder line with a synchronous clock signal in synchronization with each other feeder line. This is accomplished using various stages of matched clock networks that use intermediary clock drivers in a branched tree fashion to supply each feeder line with a clock signal in synchronization with the other feeder lines. Therefore, at any tap location along a feeder line, there will be some clock signal skew associated with that location. The present invention attempts to reduce this quantity by providing many global drivers and uniformly spacing them throughout the microprocessor device as shown in FIG. 2 to reduce the distance between a clock driver and the tap location. According to the present invention, a component within the microprocessor can tap onto a location within any feeder line 31 and receive a clock signal that contains only a 100 picosecond (0.1 nanosecond) skew (associated with the last metal4 layer) with reference to the main system clock signal generated by circuit 110. There is additionally an approximately 200 picosecond or less skew associated with mismatched components of the matched input stages in the total analysis.

The present invention achieves a 100 picosecond maximum signal skew by providing a number of global drivers (approximately 30) along the right and left edges of the microprocessor 200 and then supplying, from each one, a feeder line into the center locations of the microprocessor device. In total, the clock distribution circuit of the present invention contains approximately 60 global drivers (30 on each side) and 60 feeder lines to supply the clock signals to the components of the microprocessor. The longest length of any of the feeder lines 31 will be approximately half of the length dimension of the microprocessor integrated circuit device. Although 30 global drivers are implemented on each side of the microprocessor 200 of FIG. 2, it is appreciated that any number of global drivers may be implemented within the scope of the present invention. What is supplied by the present invention is a uniform distribution of drivers to supply the interior circuit portions of the microprocessor. This distribution can be reached using more or less global drivers as the case may be.

The preferred embodiment of the present invention advantageously locates the global drivers 30 on the periphery of the microprocessor device with the power pad areas of the integrated device. Power is delivered to microprocessor 200 via various power pad cells which are located along the periphery of the microprocessor device. Surrounding each power pad cell is an area of the integrated circuit that is typically void of circuitry. This is the case because unlike a communication pad, a power pad cell has no associated and complex input and output circuitry and also ESD protection (electrostatic discharge) circuitry required to interface the microprocessor with the outside system. Therefore, the area (cell) surrounding a power pad is generally free of circuitry and can be advantageously utilized by the present invention for placement of the global drivers. Furthermore, by placing the clock drivers near the power pad cell they receive a strong power supply in order to compensate for the effective capacitive loading of the clock lines due to their relatively large width. In addition, by placing the global drivers nearer to the power supply, the power supply lines are shorter (and have less resistance to current flow) and therefore generate less circuit noise.

Figure 1A:
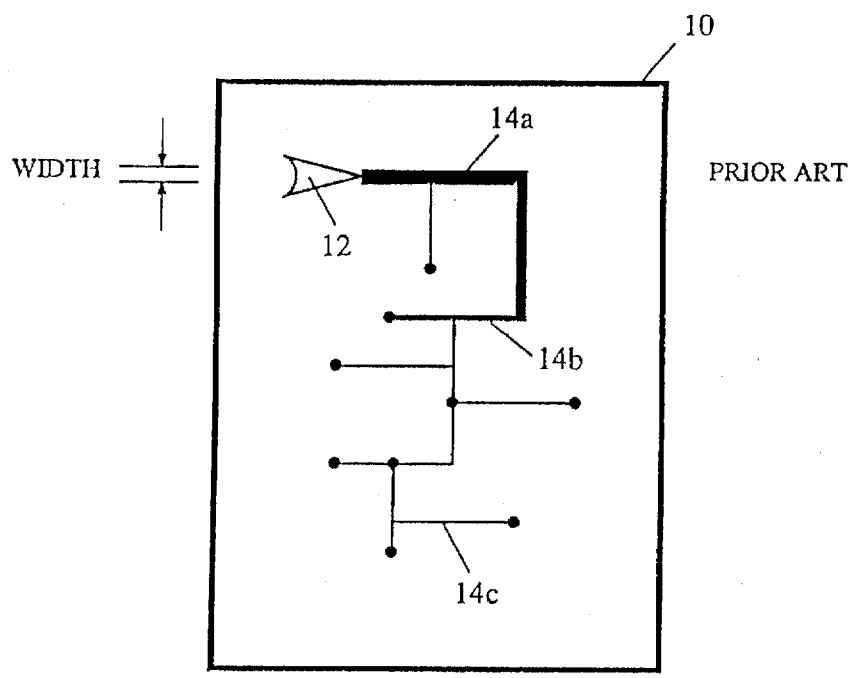
FIG. 1A illustrates a prior art system of clock signal distribution using only a single high power signal driver.
Figure 1B:
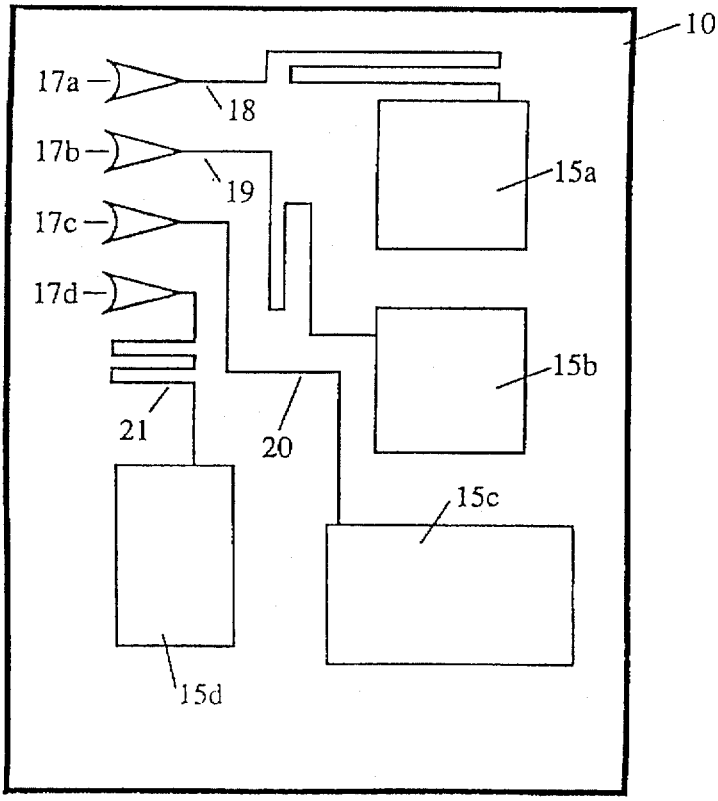
FIG. 1B illustrates a prior art system of clock distribution that utilizes a separate and matched signal line for each circuit component.
Figure 1C:
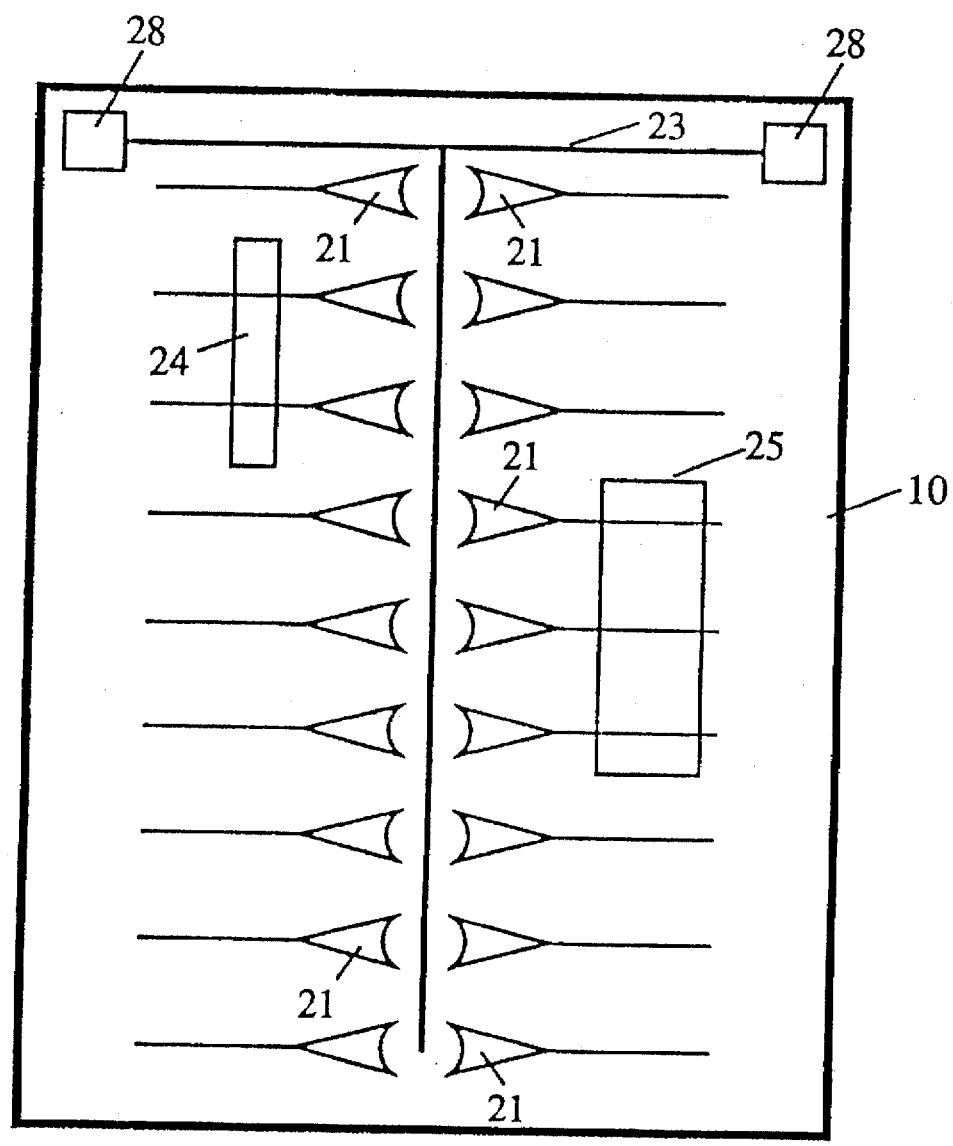
FIG. 1C illustrates another prior art system of clock distribution using a distributed network driver array that generates noise and consumes microprocessor circuit space.
Figure 3:
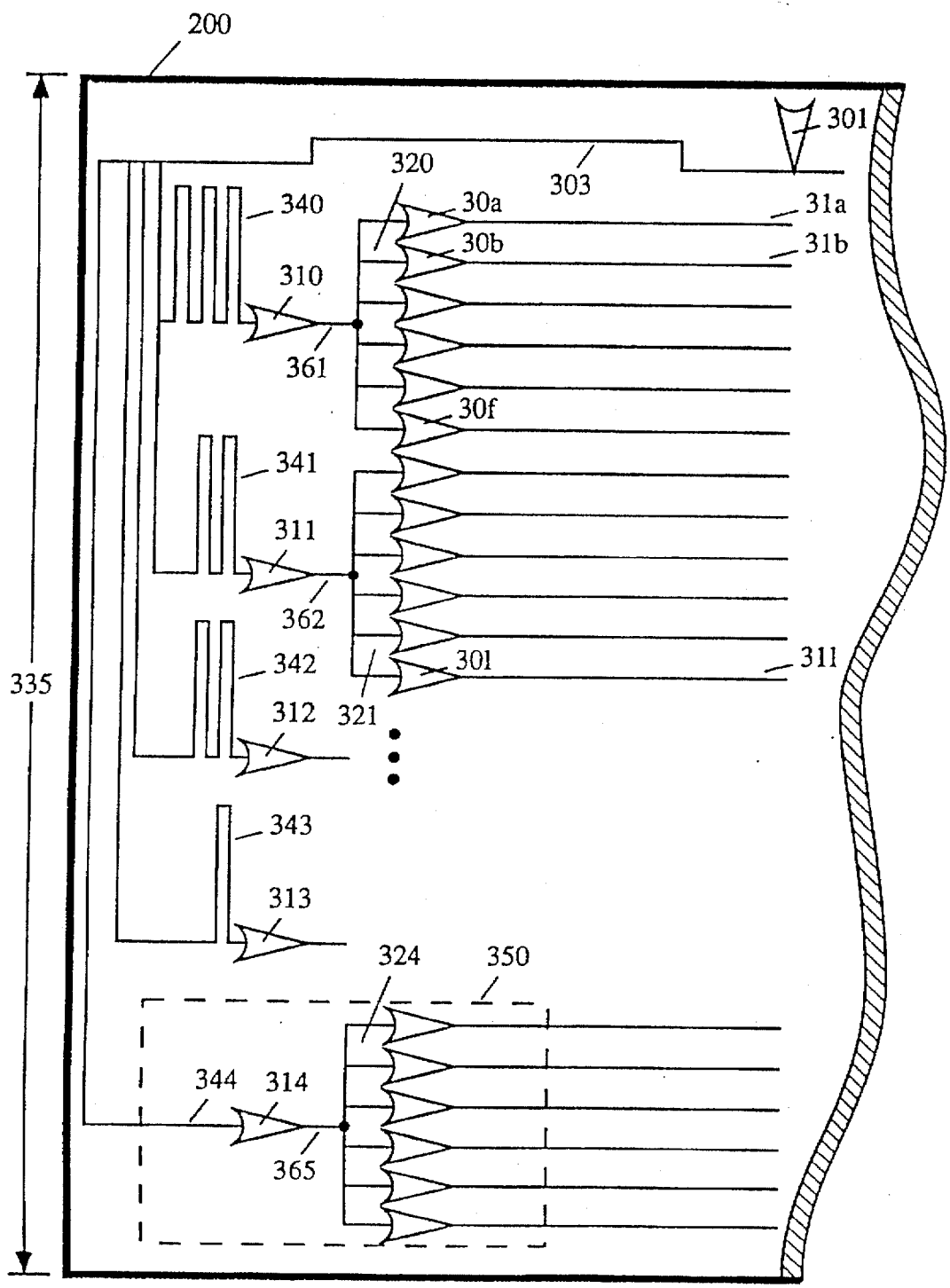
FIG. 3 is an illustration of the present invention clock distribution network showing the matched stages associated with the intermediary drivers and global drivers.

Refer now to FIG. 3 which illustrates in more detail the components of the preferred embodiment of the present invention. It is appreciated that FIG. 3 illustrates the circuitry of the present invention that exists on one side (left) of the microprocessor chip and that this circuitry is replicated for the opposite (fight) side. Therefore, it is understood that discussions regarding the left side of the chip are analogous to and apply with equal weight to the other side of the microprocessor 200. The global drivers 30 and associated supply circuitry (i.e., driver 314) are located within an area of the outlined power pad cell 350 that is not occupied by the actual power pad itself. As discussed above, this area is typically not used by the microprocessor topology. It is appreciated that each of the global drivers and associated supply circuitry are located within power pad cells and that illustrated cell 350 is one of many cells of the microprocessor.

In an effort to insure that each of the global drivers 30 generate a synchronous clock signal, the present invention utilizes two supply stages having special matched networks for each composed of a common driver and several intermediary drivers. The common driver supplies the intermediary drivers which each supply a set of several global drivers. The common driver 301 supplies a clock signal over a common network 340–344 (for each side) which couples the intermediary drivers to the common driver. The intermediary drivers couple to the global drivers via intermediary networks 361–365. As shown in FIG. 3, there is a common signal driver 301 located in the upper central portion of the microprocessor 200. This central driver may be located in any position within the microprocessor or on the microprocessor periphery. According to the preferred embodiment of the present invention this driver is selected at upper central location equidistant from the two opposing edges so that it can supply both sides of the microprocessor 200 with a clock signal. The common signal driver 301 supplies a clock signal to a number of intermediate clock drivers 310, 311, 312, 313 and 314. Five such intermediate clock drivers are selected for illustration, however the actual number of intermediate drivers is arbitrary within the preferred embodiment of the present invention. There are five signal lines 340 to 344 that supply the clock signal from the common driver 301 to each of the intermediary drivers 310–314 respectively.

Each of these five lines 340–344 of the common network are matched for their resistance and capacitance values such that each line has similar RC values and thus have matched skew. The resistance values of these five lines are matched according to the present invention by using, for each, the same length of signal line. This is accomplished by double back technique whereby short distance lines are doubled back in repetition until they equal the longer supply lines. For instance, intermediary driver 314 is the longest distance away from common driver 301, therefore the connecting line 344 has no double back lengths. However, driver 310 is the nearest to the common driver 301 and therefore this line 340 has at least three double back lengths. Similarly, lines 341, 342, and 343 of the common network have different degrees of double back lengths relative to the distance between the common driver 301 and the line's associated intermediary driver 311, 312, and 313 respectively. Also, each of the five lines are constructed to have the same width along the top processing layer of the microprocessor. Therefore, each of the lines 340–344 of the common network are constructed to the same lengths and widths to match effective resistance. It is appreciated that each of the lines 340–344 and the common supply line 303 are composed of the $M_4$ metal.

The common supply line 303 and each of the lines 340–344 of the common network are routed along the periphery of the microprocessor in an area called the power supply ring or equalization ring. This is done because the topology of the microprocessor in this ring is fairly constant, therefore any dielectric constants associated with the five lines are going to be constant. Therefore, the capacitance of each line predictable. Further, the predictable. Further, the pathways and double back lengths can be better controlled by locating these signal lines within the power supply ring of the microprocessor. Further, each of the five lines are terminated with the same load. All of the above is done in an effort to match the resistor-capacitor (RC) characteristics of the supply lines 340–344. When the above is done, the supply lines into the intermediary clock drivers 310–314 will be "matched" and a matched network is realized.

Each intermediary driver of FIG. 3 supplies a separate set of 6 global drivers. Intermediary driver 310 thus supplies set 320 over intermediary network 361. Set 320 is composed of six global drivers labeled 30a to 30f. Similarly, intermediary driver 311 supplies the six global drivers of set 321 over intermediary network 362. Also, the driver 314 supplies set 324 over intermediary network 365. Similarly, drivers 312 and 313 each supply a separate set of six global drivers that are not illustrated for clarity. It is appreciated that each set of global drivers supplied by drivers 312 and 313 are analogous to the driver sets that are described and illustrated herein. The supply network 361 is RC matched such that each of the supply lines between the intermediary driver 310 and each global driver 30a–30f is of the same length and width. Further, since the network 361 is constructed within the power supply ring, each line contains fairly constant capacitive loading so the entire network 361 is RC matched. The same is true for all of the networks 362, 365 and those associated with drivers 312 and 313 not shown; they are all RC matched. Therefore, according to the present invention, there are two stages of clock supply for the global drivers. The first stage is composed of a single common driver 301 which supplies a clock signal over a matched network (lines 340–344) to a set of intermediary drivers 310–314. The second stage is composed of the intermediary drivers each supplying a clock signal over a matched network (361, 362, 365, etc.) to a separate set of six global clock drivers. By constructing its supply scheme in this fashion, the present invention allows each of the global clock drivers to receive and generate synchronized clock signal that contains less than 100 picoseconds of skew (associated with the feeder lines since the matched stages may add more) with respect to the signal generated at the common driver 301.

Further, the present invention advantageously locates the intermediary and global drivers next to the power pads of the microprocessor 200 that are located along the periphery of the microprocessor. This is done because the clock drivers require high power to drive the clocking signals to all of the clocked components of the microprocessor topology. Further, it is desirable to locate the clock drivers (both intermediary and global drivers) next to the power pads so that the power lines that supply the drivers can be relatively short. Shorter lines have less resistance associated with them. The lower resistance power lines of the present invention also tend to generate reduced noise levels. By reducing the resistance and associated noise within the power lines, the clock drivers of the present invention have rapid rise and fall times while generating reduced noise levels associated with the clock signal. It is appreciated that the common driver 301 also supplies the right side global drivers (not shown). The right side of the microprocessor contains the same two matched stages as described with respect to the left side drivers. The common driver 301 may be supplied with the clock signal from an external pin or a clock generator or oscillator circuit that is well known in integrated circuit technology.

Further, as discussed above, a phase locked loop (PLL) circuit may be utilized that is coupled between the clock circuit 110 (see FIG. 8) and the driver 301. The PLL circuit accepts the clock circuit 110 as one input plus a second feedback input that may be selected from among any feeder line (i.e., line 31b). The output of the PLL circuit (not shown) is then coupled to the input of driver 301. It is appreciated that the details of such a PLL clock supply circuit is not pertinent to the understanding of the present invention.

Each of the feeder lines associated with the global driver circuits is relatively wide and therefore has a high capacitance. However, since they are made of $M_4$ metal, they have a low resistance and therefore a low RC skew is associated along the lengths of the lines. Feeder lines 31a to 31L are associated with the global drivers of set 320 and set 321. Therefore, since there are thirty global drivers along the edge of the microprocessor there are thirty feeder lines 31 associated with the illustrated edge of the microprocessor 200 of FIG. 3. According to the preferred embodiment of the present invention, the total width (height) of all of the widths of the feeder lines of each of the six sets 320–324 for both sides (i.e., 60 feeder lines total) must be equal to or less than 5 percent of the total height dimension of the microprocessor. Therefore, since the dimension 335 of microprocessor 200 is approximately 12,000 microns, 5 percent of this figure is approximately 600 microns. Therefore each feeder line of this example is approximately 600/60 or 10 microns wide. However, as a general rule the feeder lines can be from 10 to 20 microns maximum width. Therefore, since the microprocessor device is approximately 12,000 microns by 12,000 in dimension, half of this length is 6,000 microns or the length of each feeder line. The feeder line dimensions in the present invention are therefore 6000 microns by 10 microns. Since there are 60 feeders lines the total area of feeder line is 600 microns by 6000 microns creating 10 squares of resistance associated with the clock supply lines of the global drivers associated with both supply sides of the microprocessor 200. It is appreciated that at this width, a feeder line has a relatively larger capacitance than smaller width clock lines. However, since each feeder line is constructed of $M_4$ metal, the feeder line has extremely low resistance and therefore the RC skew associated with the feeder line is low.

Figure 4:
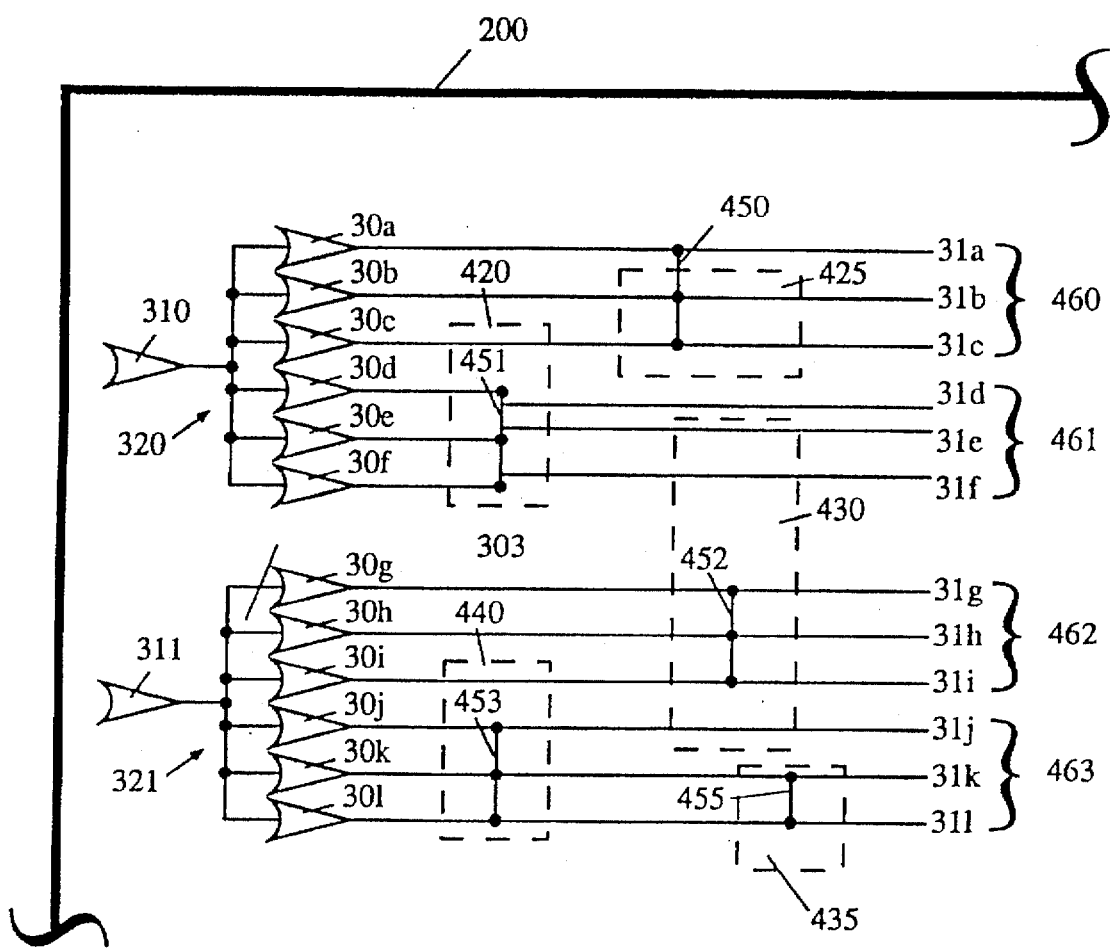
FIG. 4 illustrates the clock distribution network of the present invention and illustrated in detail the alignment lines used to couple the global drivers to the integrated circuit components.

Refer now to FIG. 4. According to the present invention, there are sixty feeder lines 31 that supply clocking signals throughout the microprocessor topology along the upper processing layer of the microprocessor. These feeder lines must couple with input clock lines of various circuit components of the microprocessor. However, it difficult to align the input clock signal lines of the component blocks with the feeder line locations. Therefore, the preferred embodiment of the present invention has supplied vertical alignment lines associated with the feeder lines to create a connection between an adjacent feeder line and a microprocessor circuit block that requires clock connection. FIG. 4 illustrates these vertical alignment lines which are 10–15 microns wide each. There are four microprocessor blocks 420, 425, 430, and 440. These blocks require input clock signals, however, the input clock lines of each block may or may not vertically align with a nearby feeder line. Therefore, vertical alignment line 450 will act to short clock input lines of component block 425 to the adjacent feeder lines 31a, 31b and 31c. These lines, and associated global drivers 30a, 30b, and 30c are called group 460. This group 460 will supply clock signals to circuit block 425. Similarly, group 461 composed of feeder lines 30d, 30e, and 30f will supply circuit block 420 via alignment line 451. Set 462 will supply circuit block 430 with a clock signal via alignment line 452 and group 463 will supply circuit block 440 via alignment line 453. In providing these alignment lines, the present invention provides a clock distribution system whereby the designers of each individual circuit block 420, 425, 430 and 440 are not required to design input clock lines that vertically align with any particular feeder line; all that is required is that the input clock line run across a vertical alignment line at some part in the topology of the circuit component.

It is appreciated that the vertical alignment lines also act to couple various segments of a feeder line that may not be perfectly aligned horizontally. For example, feeder lines 31d, 31e, and 31f are not perfectly aligned on the left and right sides of alignment line 451. Line 31d drops slightly on the right, and lines 31e and 31f rise slightly to the right. The alignment line 415 acts to connect these slight misalignments and couples the various segments of these feeder lines together. The misalignment amount is typically on the order of a few microns between segments of a feeder line.

Referring still to FIG. 4, each of the vertical alignment lines is constructed of $M_3$ metal which is a lower level metal then the $M_4$ metal. The present invention utilizes $M_3$ metal because both power and clock signals run parallel in the $M_4$ level and vertical coupling lines would thus short these two different lines together which is undesirable. Therefore, to avoid this result, a different level, $M_3$, was selected to run the vertical alignment lines. There can only be two alignment lines for any given group of feeder lines. This is due to the build up of resistance added upon addition of alignment lines. As show in FIG. 4, alignment line 455 is the second alignment line added to group 463. This line 455 is added to power circuit block 435. Since there are two vertical alignment lines 453 and 455 coupled to the feeder lines of group 463 there may not be any additional vertical alignment lines attached to group 463. It should be noted that the more uniform the $M_4$ feeder lines 31 are across the microprocessor the less the resistance contribution of the $M_3$ alignment lines will be. In other words, when vertical alignment lines short adjacent feeder lines that are spread far apart the alignment line will contribute relatively more resistance and signal skew to the clock supply network then if the feeder lines were closely spaced. Therefore, it is advantageous according to the present invention to locate the feeder lines 31a–31l uniformly across the microprocessor side. It is appreciated that vertical alignment lines typically short anywhere from two to eight feeder lines within the present invention.

It is appreciated that FIG. 4 illustrates only two groups 320 and 321 of the five groups of the left side of the clock distribution network of the present invention. It is understood that the other three groups are analogously coupled to supply clock circuits to various other component blocks of the microprocessor 200. Further, it is understood that the right side of the microprocessor is also analogously coupled.

Only global driver groups 320 and 321 of the present invention are illustrated in FIG. 4 for clarity, but it is understood that the entire clock distribution network of the present invention contains similar structure and function. Therefore, according to the above discussions, the present invention clock distribution network advantageously provides 60 feeder lines with which various component blocks of a microprocessor topology may be coupled. At any point along any of the 60 feeder lines a component block can expect to receive a clock signal with less than 100 picoseconds of clock skew because of the unique and advantageous clock distribution system of the present invention.

It is appreciated that the selection of 30 global drivers for each vertical edge of the microprocessor 200 is purely an arbitrary number and more or less can be selected within the scope of the present invention. The only limitation being the amount of free space within the topology of the microprocessor allowing for clock signal generation and distribution. The circuit components of the microprocessor 200 are those components utilized to constitute the overall microprocessor. These components may typically include the Arithmetic Logic Unit (ALU), the Instruction Fetch Unit (IFU), Execution Units, Cache Units and Bus Control Units among others.

Figure 5:
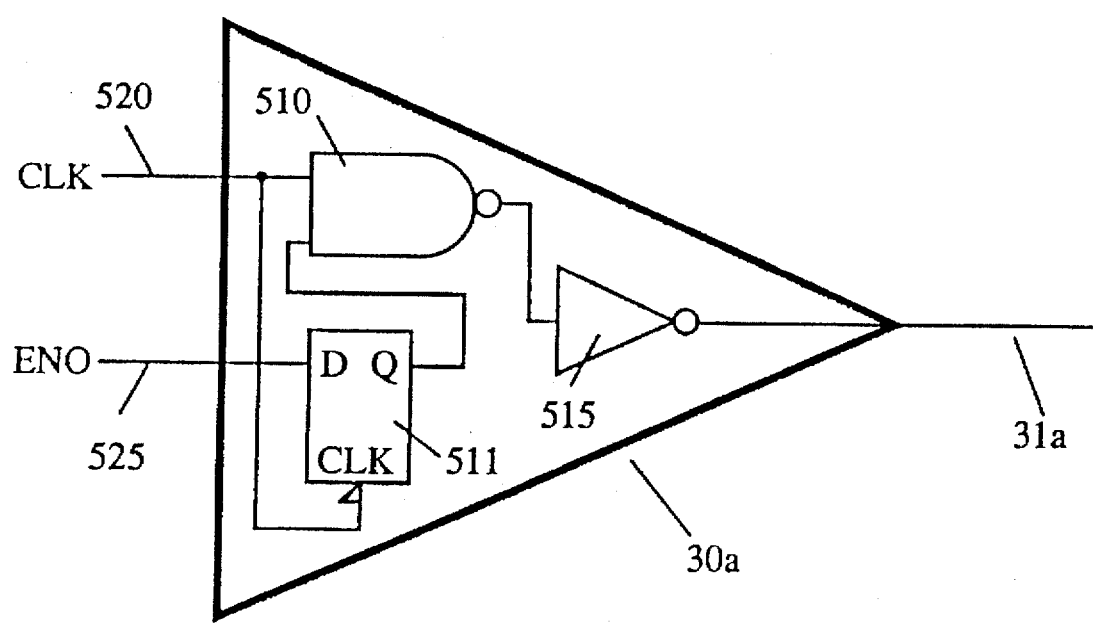
FIG. 5 is an illustration of a global driver and shows in detail the enable and disable functions of the global driver.

Clock Interrupt Feature of the Present Invention:

The preferred embodiment of the present invention also provides the ability to disable the clock signal to any feeder line group (i.e., any feeder lines that shorted via a common vertical alignment line). This is accomplished via further circuitry associated with each global clock driver and associated with the distribution network. FIG. 5 illustrates the global driver of the present invention that contains the enable logic required to disable the clock signal. A global driver 30a is illustrated in more detail. An input 520 carries the clock signal into the driver and input 525 carries an enable signal into the driver. Both the enable line and the clock signal are input into a latch circuit 511. The clock signal is fed to the clock input which is asserted low and the enable signal is fed to the latch D input. The Q output of the latch 511 is fed to a NAND gate 510 as well as the clock signal. Therefore, when the input of the enable pin 525 goes low the NAND gate 510 will always output a high signal. When the input of the enable pin 525 goes high (asserted) the output of the NAND gate will be the inverse of the clock signal 520. The output of the NAND gate 510 is then coupled to the input of an inverter 515 and the output of the inverter is taken as line 31a of the driver 30a. According to the present invention when the enable line is not asserted to a global driver 30a, the clock signal will not be driven on the associated feeder line 31a. When the enable line is asserted then the global driver will act as described above to drive its associate feeder line with a clock signal.

The latch 511 is implemented by the present invention so that no enable action will take place while the clock signal is asserted high. That is, all enable state changes will take place one clock cycle after the clock cycle in which the enable signal changed status. When the clock is high, it is not desirable for the microprocessor to change enable states, therefore the latch 511 prevents the enable signal from reaching the NAND gate 510 until the clock transitions low since the clock input is low asserted to latch 511.

Figure 6A:
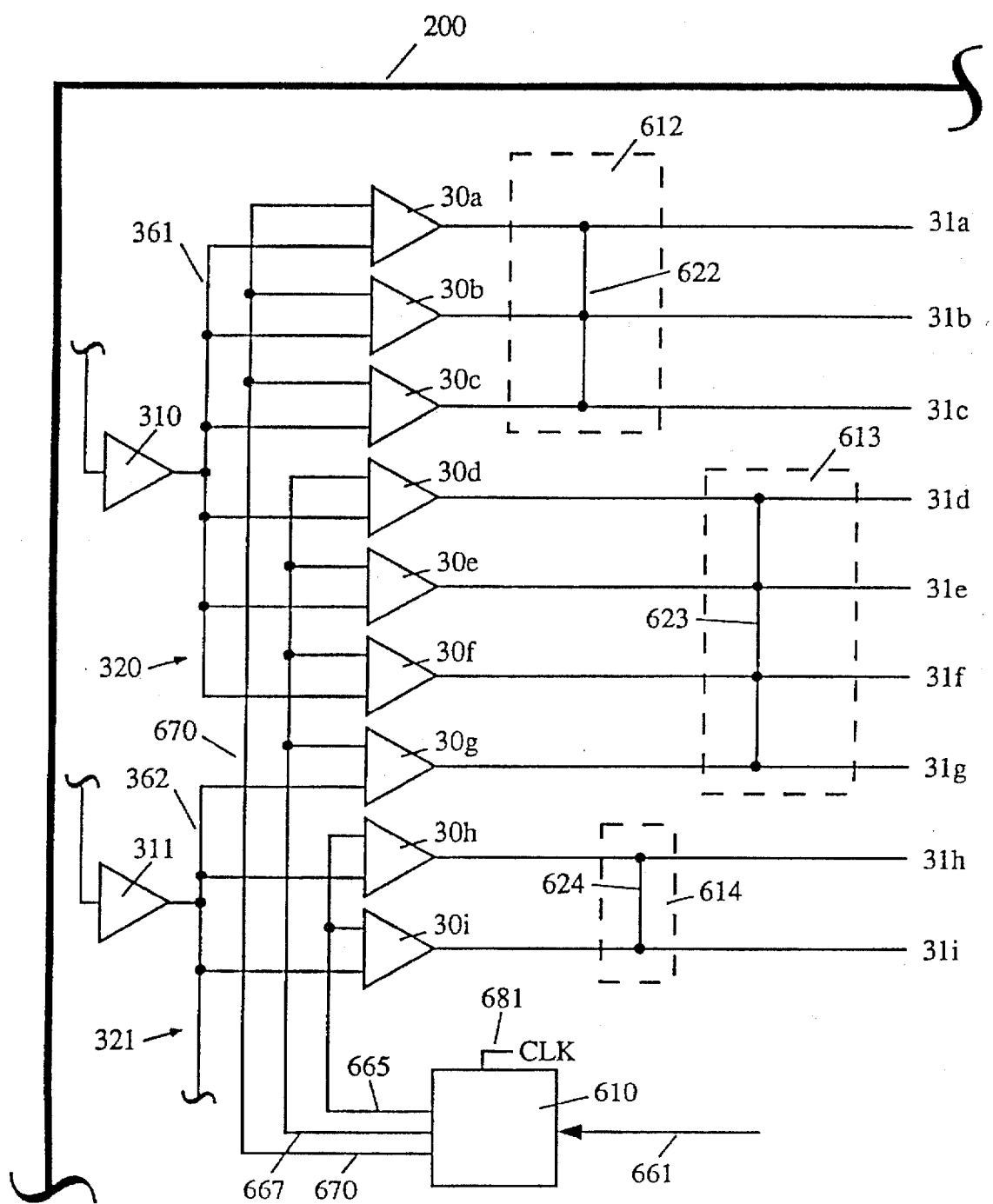
FIG. 6A is an illustration in detail of the power management functions of the present invention including the enable network coupled to the global drivers.

FIG. 6A illustrates, not to scale, a microprocessor 200 with an enable network design that can be constructed within the present invention utilizing the global drivers as shown in FIG. 5. FIG. 6A illustrates set 320 and part of set 321 adopting the clock interrupt features of the present invention. Set 320 is driven by the high power intermediary driver 310. Each of the six global drivers 30a–30f are coupled to the intermediary driver 310 via a matched network 361 having equal length and width input lines and matched capacitance within the power supply ring. Also coupled to each global driver 30a, 30b and 30c is an enable_0 line on line 670. The enable_0 line is also coupled to a power management unit 610. Coupled to the remainder of the global drivers of set 320 (30d, 30f, and 30g) as well as the global driver 30g of set 321 is another enable line 667, enable_1. Enable line 667 is also coupled to the power management unit 610. A further enable line 665, enable$_{13}$ 2 is coupled to global drivers 30h and 30i of set 321 and also coupled to the power management module 610. A clock supply is also delivered to the power management module via line 681. An disable/enable request line 661 is supplied to the power management module 610. The disable/enable request line 661 specifies which of the enable lines 665, 667, and 670 will be asserted or not. It is appreciated that each intermediary driver 310 and 311 couples to one input of each NAND gate of each global driver while each enable line is coupled to the other input of each NAND gate of each global driver.

A vertical alignment line 622 shorts feeder lines 31a–31c and supplies a clock signal to circuit block 612. Further, a vertical alignment line 623 shorts feeder lines 31d–31g and delivers a clocking signal to circuit block 613. Lastly, a vertical alignment line 624 shorts feeder lines 31h and 31i to supply a clock signal to circuit block 614. Feeder lines 31a–31c and associated global drivers form a group that is controlled by enable_0 line 670. Feeder lines 31d–31g and associated global drivers form a group that is controlled by enable$_{13}$ 1 line 667. Feeder lines 31h–31i and associated global drivers form a group that is controlled by enable_2 line 665. According to this configuration, when the power management module 610 disables line 670, the enable_0 pin is not asserted and the clock signal to circuit block 612 is temporarily interrupted until the enable_0 pin 670 is once more asserted. In so doing, the present invention offers a system by which circuit block 612 can be powered down during periods of power management. It is appreciated that each individual grouping of feeder lines (defined by the vertical alignment) must share the same enable line. As shown in FIG. 6A, intermediary clock driver 311 supplies the clocking signal to global drivers 30g, 30h and 30i of set 321.

Similarly, the power management module 610 may interrupt the supply of the clock signal to circuit 613 by disabling enable_1 via line 667 or enabling the clock signal to circuit 613 by asserting line 667. The power management module 610 may interrupt the supply of the clock signal to circuit 614 by disabling enable_0 via line 665 or enabling the clock signal to circuit 614 by asserting line 665. The disable/enable request line 661 is a parallel input line that carries a flag bit for each circuit block of the microprocessor topology. If a particular circuit block is desired to power down then the bit associated with that circuit block is set off "0." Table 1 below indicates the different values that may be sent over the enable/disable line 661 to control the power states of the circuit blocks 612, 613, and 614.

TABLE I

| Line 661 | Status of: | | |
|---|---|---|---|
| Enable/Disable | Block 612 | Block 613 | Block 614 |
| 000 | OFF | OFF | OFF |
| 001 | OFF | OFF | ON |

TABLE I-continued

| Line 661 | Status of: | | |
|---|---|---|---|
| Enable/Disable | Block 612 | Block 613 | Block 614 |
| 010 | OFF | ON | OFF |
| 011 | OFF | ON | ON |
| 100 | ON | OFF | OFF |
| 101 | ON | OFF | ON |
| 110 | ON | ON | OFF |
| 111 | ON | ON | ON |

According to the above description, the present invention may selectively interrupt supply of the clock signal to any of the circuit blocks of the microprocessor topology. This is advantageous in environments where power consumption needs to be regulated and conserved, such as within a laptop or battery operated computer system environment. By utilizing the power management module, a microprocessor or operating system may determine that certain blocks within the microprocessor should be powered down to conserve power and the microprocessor and computer system may enter a standby or suspend mode. The microprocessor will then output a "0" in the bit flag that represents the associated circuit block that will be suspended. The associated enable line will then shut down the clock drivers associated with the group of drivers and feeder lines that power the particular circuit block (via a common vertical alignment line).

It is appreciated that according to another embodiment of the present invention, each of the enable lines could alternatively be driven to the intermediary clock drivers 310–314 to disable clock supply to the matched network that supplies the sets of global drivers. Using this design, entire sets (i.e., 320–324) of global drivers would be controlled by a signal enable line. This implementation is a less complex implementation compared to the one discussed above of the preferred embodiment. However, this embodiment is less flexible since the enable lines power down an entire set of global drivers at a time by disabling the intermediary drivers. If there happens to be multiple components feeding from the same global driver set, they will all be powered down at the same time and will not be individually controlled. Further, if a single component spans several sets than this embodiment may not be as flexible in powering down that component as the preferred embodiment of the present invention.

For clarity and purposes of discussion, only two sets 320 and 321 of the clock distribution network have been illustrated within FIG. 6A. However, the discussion of these two sets is applicable to all sets of each of the two vertical edges of the microprocessor of the present invention. It is appreciated that the decoding scheme of Table I will be extended to accommodate further circuit blocks of microprocessor 200 that are associated with the other sets of the clock distribution network. Consistent with the above, it is appreciated that the power management module 610 also generates enable signals that control the supply of clocking signals to the global drivers located on the right edge of the microprocessor.

Figure 6B:
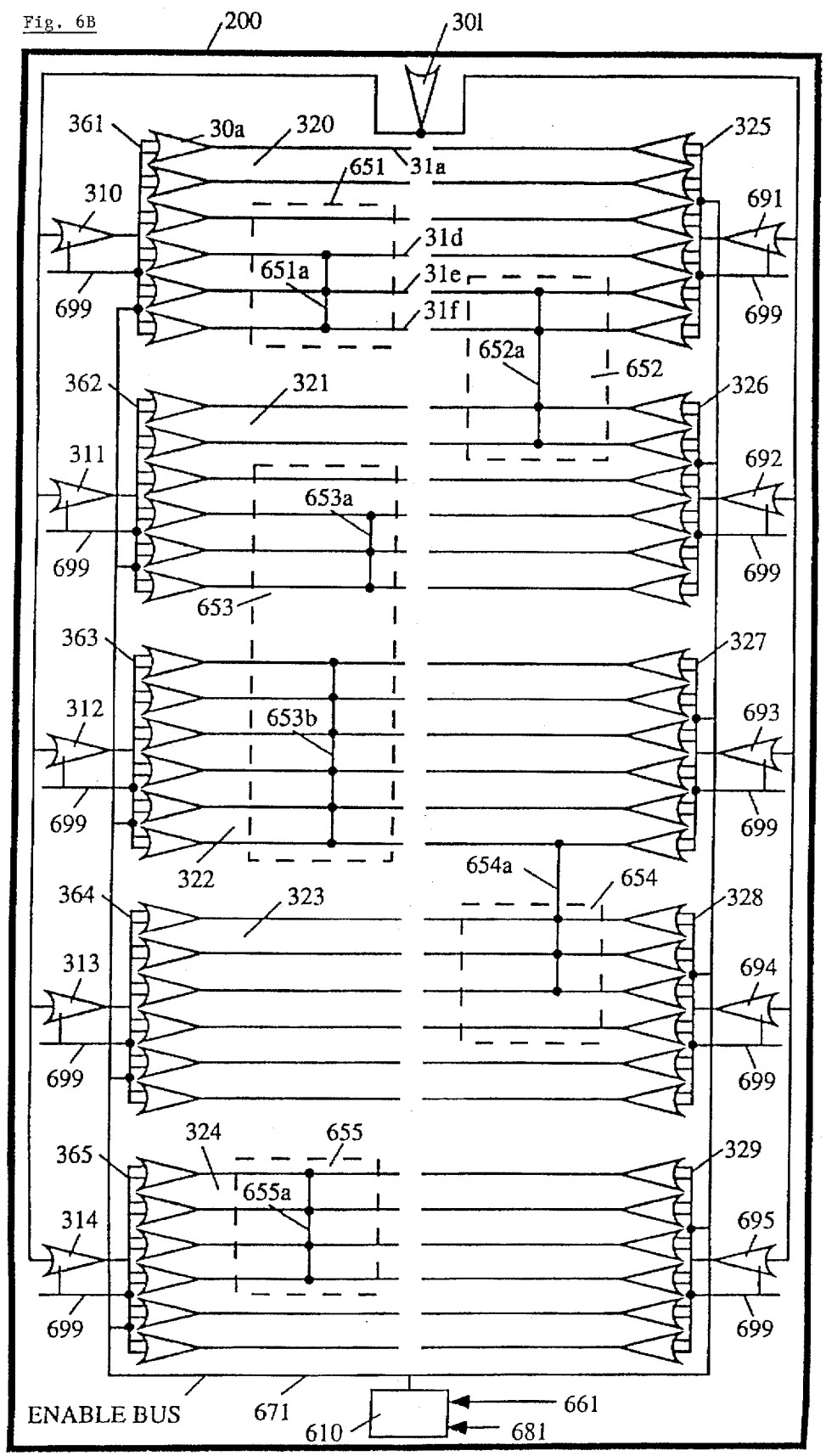
FIG. 6B is an illustration of a microprocessor of the present invention and a full clock distribution network of the present invention including the 60 global drivers and the power management network and unit.

Overall Clock Supply and Interrupt Network:

FIG. 6B illustrates, not to scale, a microprocessor 200 with an enable network design that can be constructed within the present invention utilizing the global drivers as shown in FIG. 5. FIG. 6B illustrates a typical clock distribution system configuration of the present invention with all of the global drivers illustrated. There are thirty global drivers on each side of the microprocessor integrated circuit.

As shown on the left, there are five sets of 6 drivers each on the left side, they are 320, 321, 322, 323, and 324. These five sets are driven by intermediary drivers 310, 311, 312, 313 and 314 respectively. The common clock driver 301 is coupled to a clock generator or oscillator as input and drives an RC matched network which supplies the five intermediary drivers 310-314 on the left and the five intermediary drivers 691-695 located on the right side. Each of the sets 320-324 is driven by its respective intermediary driver via an RC matched network. By employing this staged distribution system with multiple matched networks per stage, the present invention is able to deliver clock signals onto the left side feeder lines of each global driver which are in synchronization.

As shown on the right side, there are five sets of 6 drivers each on the right side, they are 325, 326, 327, 328, and 329. These five sets are driven by intermediary drivers 691, 692, 693, 694 and 695 respectively. The common clock driver 301 supplies the five intermediary drivers 691-695 via a separate RC matched network for each. Each of the sets 325-329 is driven by its respective intermediary driver via an RC matched network. By employing this staged distribution system with multiple matched networks per stage, the present invention is able to deliver clock signals onto the right side feeder lines of each global driver which are in synchronization. Therefore, according to the above, the microprocessor generates 60 feeder lines, one for each global driver to supply the microprocessor components with a synchronized clock signal. It is appreciated that the matched network that supplies all of the intermediate drivers, on the left and right, exists within the power supply ring of the periphery of the microprocessor. It is further appreciated that the intermediary drivers, the matched networks that supply the global drivers and the global drivers are all located within the power supply cells of the microprocessor.

With reference to FIG. 6B, there are five microprocessor components illustrated, 651, 652, 653, 654 and 655. It is appreciated that there can be a variety of different circuit components placed at different locations within the microprocessor consistent within the scope of the present invention clock distribution and interrupt network. The following components are shown for illustration of the element of the present invention, Circuit component 651 is supplied with a clock signal via alignment line 651a which shorts feeder lines of set 320. Circuit component 652 is supplied with a clock signal via alignment line 652a which shorts feeder lines of set 325 and 326. Circuit component 653 is supplied with a clock signal via alignment line 653a and 653b which shorts feeder lines of set 321 and 322. Circuit component 654 is supplied with a clock signal via alignment line 654a which shorts feeder lines of set 327 and set 328. Circuit component 655 is supplied with a clock signal via alignment line 655a which shorts feeder lines of set 324. According to the clock distribution network of the present invention, by tapping into the feeder lines, via associated alignment lines, a component block circuit is insured a clock signal with less than 100 picosecond clock skew associated with the feeder lines.

FIG. 6B also illustrates power supply lines 699 that are coupled to each of the 10 intermediary clock drivers 310-314 and 691-695. The power supply lines 699 are also coupled to each of the global drivers coupled to the intermediary clock drivers. The power supply lines 699 are also coupled to the power pads (not shown) of the power cells of the microprocessor for access to Vcc and Vss. By locating the intermediary and global clock drivers next to the periphery of the microprocessor, the power supply lines 699 are advantageously short and therefore generate reduced noise over the clock network and the microprocessor of the present invention.

A power management module 610 is provided in the microprocessor device 200 of FIG. 6B. A disable/enable request line 661 is fed into the power management module from the microprocessor device. When active, this line 661 indicates to the power management module which of the five components 651-655 to be enabled or disabled. There is a flag within the power management module for each component and if that flag is asserted then the component is supplied a clock signal. If that flag is reset to zero then the component is not supplied a clock signal. The clock signal is also supplied to the power management module 610 via line 681. The power management module outputs an enable bus 671 that carries five separate enable lines, one for each component. Each enable line is responsible to coupling to the global drivers that supply a component with a clock signal. When that component is selected for power down, the respective enable line will become disabled to disable each global driver.

The enable bus 671 is fed to each of the supply networks for each of the 10 sets 320-329 and a particular enable line will be fed to each of the NAND gates of each global driver. Within the enable bus 671 there are five enable lines: enable_0 which controls component block 651; enable_1 which controls component block 652; enable_2 which controls component block 653; enable_3 which controls component block 654; and enable_4 which controls component block 655. The enable_0 is fed to set 320 and will disable the bottom three global drivers of set 320 that are shorted by alignment line 651a. The enable_1 is fed to set 325 and to set 326 and will disable the bottom two global drivers of set 325 and the top two global drivers of set 326 that are shorted by alignment line 652a. The enable_2 is fed to set 321 and to set 322 and will disable the bottom three global drivers of set 321 and all six global drivers of set 322 that are shorted by alignment lines 653a and 653b. The enable_4 is fed to set 327 and to set 328 and will disable the bottom global driver of set 327 and the top three global drivers of set 328 that are shorted by alignment line 654a. The enable_4 is fed to set 324 and will disable the top four global drivers of set 324 that are shorted by alignment line 655a. Therefore, the microprocessor may independently and selectively interrupt clock supply to any components within the microprocessor device in an effort to conserve power across the microprocessor 200.

Figure 7:
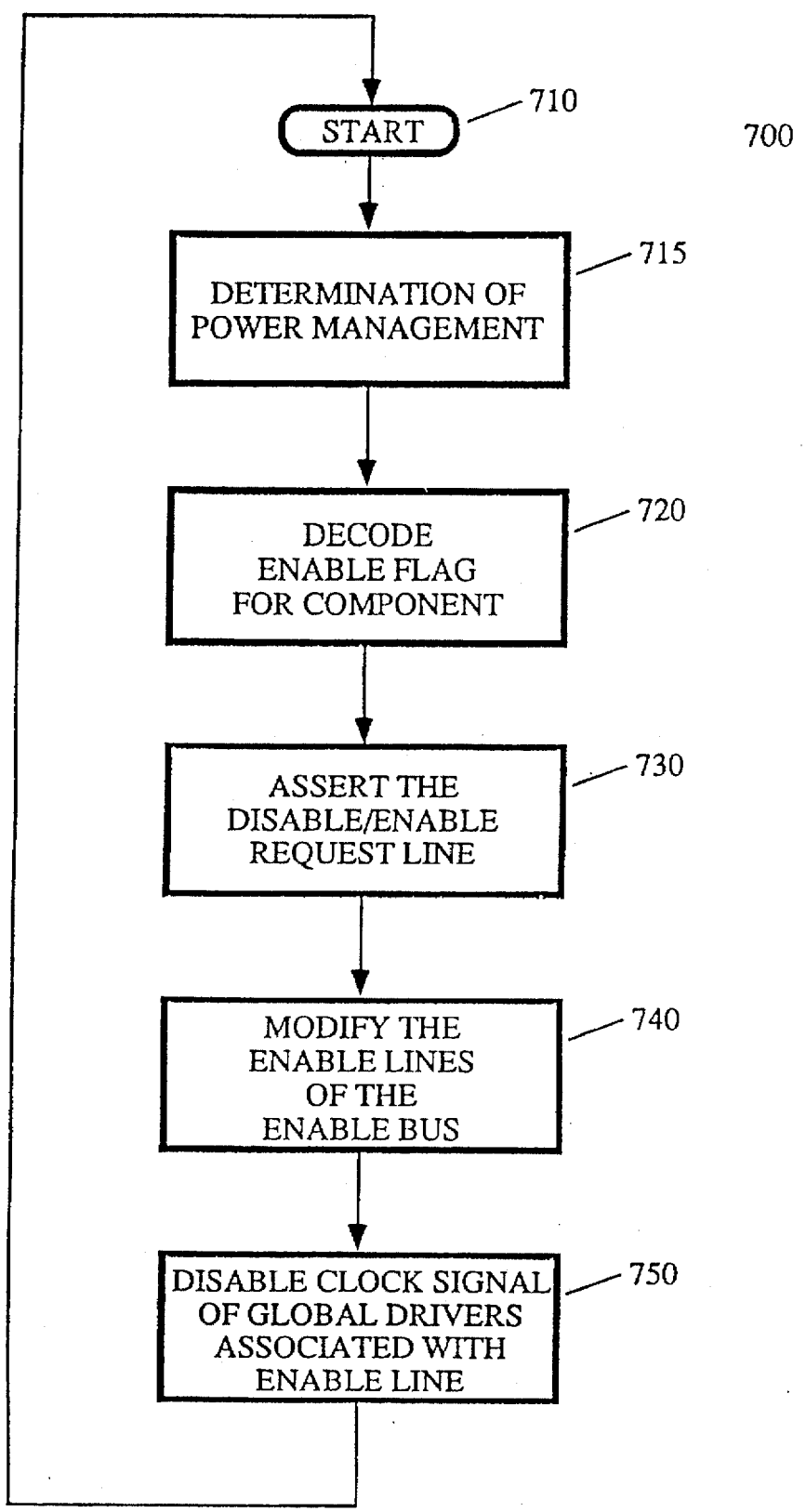
FIG. 7 is a flow diagram of the present invention illustrating the major process steps employed by the present invention to perform power management functions.

Power Management Procedure of the Present Invention:

With reference to FIG. 7, the procedure utilized by the present invention for power management of the individual components of the integrated circuit 200 is illustrated. This flow 700, begins in block 710 and continues to 715 where it is determined by the microprocessor that a power management action must be taken. This indication may arise from an external input originating from the overall system 130 or may arise from within the microprocessor 200. Either way, a determination is made that the system or the microprocessor or individual components within the microprocessor 200 are within an idle state and therefore power down is desired. Or, alternatively, it may be determined at block 715 that the microprocessor and/or system 130 has been activated subsequent to a power down state and therefore components of the microprocessor should be enabled with the clock signal. Once it is determined that a power management action is desired, at block 720 the microprocessor determines which components and component blocks within the microprocessor should be powered down or enabled. Once the components are selected, a flag for each component is set and decoded ("1" for enable and "0" for disable) and added to an disable/enable data structure. Once the disable/enable data structure is created, at block 730 this data is signaled over the disable/enable line 661 to the power management module 610 as a disable/enable request.

The power management module 610, at block 740, then decodes the disable/enable request data structure to modify the signal levels on the enable lines that are coupled to the global drivers. The power management module translates the flag set in the disable/enable data structure to its corresponding component block and then locates the enable line or lines that disables and enables that particular component. Once the enable line is found, the appropriate signal level is output (clocked by line 661) on that enable line depending on the flag indicated value. At line 750 the NAND gates of the global drivers associated with the enable line that has been modified then respond to the signal assertion. If the line goes low, then the global drivers associated with that enable line will not generate a clock signal. If the line goes high, then the global drivers will generate a clock signal. Thus, the component block that receives its clock signal from these targeted global drivers will either power down or power up depending on the flag indication. Thereafter, the processing will return to block 700 for another power management determination.

Figure 9:
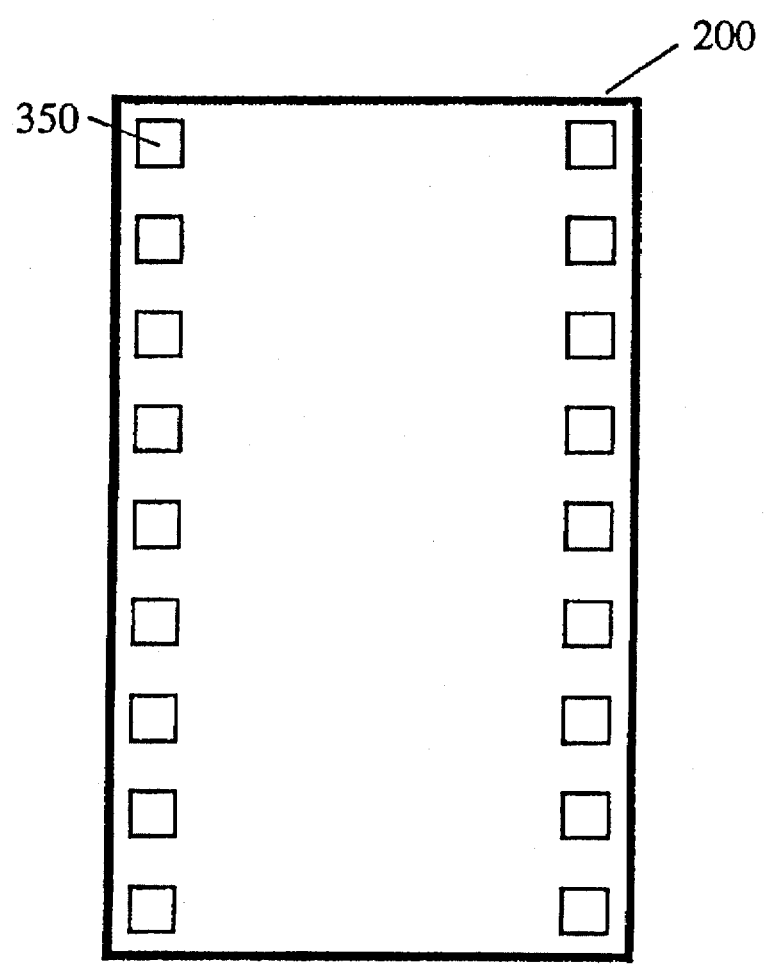
FIG. 9 illustrates the power supply pads utilized by the present invention clock supply network.

FIG. 9 better illustrates the location of the power pad cells 350 of the microprocessor device 200 wherein the clock drivers of the present invention are located. As shown, these power pad cells run along the periphery of the microprocessor and provide a uniform platform upon which to supply the clock supply network of the present invention. It is appreciated that the exact number of power supply cells is not crucial to the spirit of the present invention. What is important are the characteristics (discussed in detail above) of such power supply pads that are advantageously utilized by the present invention for RC matching of the clock input lines to the global drivers.

The preferred embodiment of the present invention, a clock distribution network and clock interrupt network for use in an integrated circuit device, is thus described. While the present invention has been described in one particular embodiment, it should be appreciated that the present invention should not be construed as limited by such embodiment, but rather construed according to the below claims.

What is claimed is:

1. In an integrated circuit device having a plurality of circuit components, an apparatus for power management of said integrated circuit, said apparatus comprising:
   a plurality of global clock drivers disposed within said integrated circuit device, said plurality of global clock drivers for generating a plurality of synchronous clock signals;
   a plurality of feeders, each feeder coupled to a global clock driver, said plurality of feeders for supplying individual circuit components of said integrated circuit device with clock signals;
   disable circuitry disposed within each global clock driver for interrupting said synchronous clock signal supplied by each global clock driver; and
   power management circuitry coupled to said disable circuitry for controlling said disable circuitry to selectively interrupt or restore said synchronous clock signal to various circuit components of said integrated circuit device.

2. In a microprocessor having a plurality of circuit components, an apparatus for power management of said microprocessor, said apparatus comprising:
   a plurality of global clock drivers disposed within said microprocessor, said plurality of global clock drivers for generating a plurality of synchronous clock signals;
   a plurality of feeders, each feeder coupled to a global clock driver, said plurality of feeders for supplying individual circuit components of said microprocessor with clock signals;
   disable circuitry disposed within each global clock driver for interrupting said clock signals supplied to said individual circuit components; and
   power management circuitry coupled to said disable circuitry for controlling said disable circuitry to selectively interrupt or restore said synchronous clock signal to various circuit components of said microprocessor.

3. An apparatus for power management of said microprocessor in accordance with claim 2 wherein said power management circuitry is coupled to receive a disable/enable request indicating which circuit components of said plurality of circuit components will or will not be supplied with said clock signals.

4. An apparatus for power management of said microprocessor in accordance with claim 2 further comprising power cells disposed along edges of said microprocessor, said power cells for providing spatial areas within said microprocessor for coupling said microprocessor to a power source and wherein said global clock drivers are disposed within said power cells of said microprocessor.

5. An apparatus for power management of said microprocessor in accordance with claim 2 wherein said disable circuitry comprises a separate enable line for each circuit component of said plurality of circuit components.

6. An apparatus for power management of said microprocessor in accordance with claim 5 wherein each enable line associated with a particular circuit component is coupled to each disable circuitry of all global drivers supplying clock signals to said particular circuit component.

7. A computer system comprising:
   a bus for coupling system components, a display device coupled to said bus, a memory coupled to said bus, an information storage device coupled to said bus and a microprocessor having power management functions, said microprocessor coupled to said bus, said microprocessor further comprising:
   a plurality of global clock drivers disposed within said microprocessor, said plurality of global clock drivers for generating a plurality of synchronous clock signals
   a plurality of feeders, each feeder coupled to a global clock driver, said plurality of feeders for supplying individual circuit components of said microprocessor with clock signals;
   disable circuitry disposed within each global clock driver for interrupting said clock signals supplied to said individual circuit components; and
   power management circuitry coupled to said disable circuitry for controlling said disable circuitry to selectively interrupt or restore said synchronous clock signal to various circuit components of said microprocessor.

8. A computer system in accordance with claim 7 wherein said power management circuitry is coupled to receive a disable/enable request indicating which circuit components of said plurality of circuit components will or will not be supplied with said clock signals.

9. A computer system in accordance with claim 7 further comprising power cells disposed along edges of said microprocessor, said power cells for providing spatial areas within said microprocessor for coupling said microprocessor to a power source and wherein said global clock drivers are disposed within said power cells of said microprocessor.

10. A computer system in accordance with claim 7 wherein said disable circuitry comprises a separate enable line for each circuit component of said plurality of circuit components.

11. A computer system in accordance with claim 10 wherein each enable line associated with a particular circuit component is coupled to each disable circuitry of all global drivers supplying clock signals to said particular circuit component.

12. In a microprocessor device having a plurality of circuit components, a method for power management of said plurality of circuit components, said method comprising the steps of:

generating a plurality of synchronous clock signals from a plurality of global clock drivers disposed within said microprocessor;

supplying individual circuit components of said microprocessor with clock signals through a plurality of feeders, each feeder coupled to a global clock driver;

temporarily interrupting said clock signals supplied to said individual circuit components via disable circuitry disposed within each global clock driver; and controlling said disable circuitry to selectively interrupt or restore said synchronous clock signal to various circuit components of said microprocessor.

13. A method for power management of said plurality of circuit components in accordance with claim 12 wherein said step of controlling said disable circuitry further comprises the steps of:

determining a power status for particular circuit components of said microprocessor;

generating a disable/enable request indicating an associated individual power status for each said particular circuit component; and decoding said disable/enable request to generate signals over a plurality of enable lines coupled to said disable circuitry to individually interrupt or restore a clock distribution to said particular circuit components depending on said power status for each of said particular circuit components.

* * * * *